United States Patent
Dekker et al.

(10) Patent No.: US 10,237,065 B2
(45) Date of Patent: Mar. 19, 2019

(54) CRYPTOGRAPHIC CHIP AND RELATED METHODS

(71) Applicant: Irdeto B.V., Hoofddorp (NL)

(72) Inventors: Hans Dekker, Hoofddorp (NL); Vladimir Zivkovic, Hoofddorp (NL)

(73) Assignee: Irdeto B.V., Hoofddorp (NL)

( * ) Notice: Subject to any disclaimer, the term of this patent is extended or adjusted under 35 U.S.C. 154(b) by 110 days.

(21) Appl. No.: 15/300,508

(22) PCT Filed: Mar. 31, 2014

(86) PCT No.: PCT/EP2014/056445
§ 371 (c)(1),
(2) Date: Sep. 29, 2016

(87) PCT Pub. No.: WO2015/149836
PCT Pub. Date: Oct. 8, 2015

(65) Prior Publication Data
US 2017/0118018 A1    Apr. 27, 2017

(51) Int. Cl.
*H04L 9/08* (2006.01)
*H04L 9/14* (2006.01)
(Continued)

(52) U.S. Cl.
CPC .......... *H04L 9/0897* (2013.01); *G06F 21/602* (2013.01); *H04L 9/088* (2013.01);
(Continued)

(58) Field of Classification Search
CPC .......... G06F 21/602; H04L 9/088; H04L 9/14; H04L 9/302; H04L 9/3249; H04L 9/06;
(Continued)

(56) References Cited

U.S. PATENT DOCUMENTS

| | | | |
|---|---|---|---|
| 6,751,735 B1 * | 6/2004 | Schell ................. | G06F 21/602 380/277 |
| 8,806,602 B2 * | 8/2014 | Radhakrishnan ..... | H04L 63/105 713/151 |

(Continued)

FOREIGN PATENT DOCUMENTS

| | | |
|---|---|---|
| CN | 101382963 A | 3/2009 |
| CN | 102484581 A | 5/2012 |

(Continued)

OTHER PUBLICATIONS

International Search Report and Written Opinion cited in corresponding International Application No. PCT/EP2014/056445 dated Dec. 4, 2014.

(Continued)

*Primary Examiner* — Kambiz Zand
*Assistant Examiner* — Mahabub S Ahmed
(74) *Attorney, Agent, or Firm* — Rimon PC; Marc Kaufman

(57) ABSTRACT

There is described a chip for performing cryptographic operations. The chip comprises a key storage module, a rule storage module, an interface module and a cryptographic module. The key storage module is configured to store one or more cryptographic keys. The rule storage module is configured to store one or more rules, each rule comprising respective rule data, the rule data identifying a respective predetermined cryptographic operation associated with the rule and further identifying at least one of the one or more cryptographic keys to be used in the respective predetermined cryptographic operation. The interface module is configured to receive a rule execution request, wherein the rule execution request comprises a rule identifier to identify a specific rule of the one or more rules to be executed. The cryptographic module is configured to execute the specific rule so as to perform the respective predetermined crypto- (Continued)

graphic operation in response to the rule execution request. The chip is configured such that the cryptographic keys and the cryptographic module may only be used by executing rules from the one or more rules in response to associated rule execution requests received by the interface module. There is also described a set top box comprising the chip, a chip-implemented method of performing a cryptographic operation, and a method of loading a new rule into a rule storage module of a chip.

17 Claims, 5 Drawing Sheets

(51) Int. Cl.
*H04L 9/30* (2006.01)
*H04L 9/32* (2006.01)
*G06F 21/60* (2013.01)

(52) U.S. Cl.
CPC ............... *H04L 9/14* (2013.01); *H04L 9/302* (2013.01); *H04L 9/3066* (2013.01); *H04L 9/3249* (2013.01); *H04L 2209/12* (2013.01)

(58) Field of Classification Search
CPC ............ H04L 9/0897; H04L 9/3066; H04L 2209/12; G06N 5/02
USPC ........................................................ 380/277
See application file for complete search history.

(56) References Cited

U.S. PATENT DOCUMENTS

| | | | | |
|---|---|---|---|---|
| 8,891,772 B2* | 11/2014 | D'Souza | ............... | H04L 9/0825 380/278 |
| 9,058,497 B2* | 6/2015 | Bharadwaj | ............ | H04L 9/0836 |
| 9,270,465 B2 | 2/2016 | Roelse | | |
| 9,774,448 B2* | 9/2017 | Oberheide | ............ | H04L 9/0861 |
| 2003/0161476 A1* | 8/2003 | Fransdonk | ............ | G06Q 20/12 380/282 |
| 2004/0193873 A1* | 9/2004 | England | ................. | G06F 9/4416 713/156 |
| 2006/0078109 A1* | 4/2006 | Akashika | ............... | G06F 21/602 380/30 |
| 2006/0265733 A1* | 11/2006 | Chen | ........................ | G06F 21/71 726/1 |
| 2007/0174621 A1* | 7/2007 | Ducharme | ............ | G06F 21/10 713/176 |
| 2008/0019527 A1* | 1/2008 | Youn | ....................... | H04L 9/083 380/278 |
| 2008/0216147 A1* | 9/2008 | Duffy | ..................... | G06F 21/645 726/1 |
| 2010/0077230 A1* | 3/2010 | Chambers | ........... | G06F 12/1408 713/193 |
| 2010/0189262 A1 | 7/2010 | Ducharme | | |
| 2010/0211787 A1* | 8/2010 | Bukshpun | ............. | H04L 9/0838 713/170 |
| 2010/0303241 A1* | 12/2010 | Breyel | ................ | G06F 11/1458 380/277 |
| 2011/0289324 A1* | 11/2011 | Yellepeddy | ............ | G06F 21/79 713/189 |
| 2012/0045062 A1* | 2/2012 | Kuno | ............... | G11B 20/00086 380/277 |
| 2012/0134492 A1* | 5/2012 | Liu | ........................ | H04L 9/0656 380/28 |
| 2012/0173885 A1* | 7/2012 | Acar | ..................... | H04L 9/0877 713/193 |
| 2013/0114810 A1* | 5/2013 | Kobayashi | ............ | H04L 9/0836 380/47 |
| 2013/0251152 A1 | 9/2013 | Roelse | | |
| 2013/0262869 A1 | 10/2013 | Roelse | | |
| 2014/0136855 A1* | 5/2014 | Ducharme | ............ | G06F 21/602 713/193 |
| 2014/0140512 A1* | 5/2014 | Hadley | .................... | G06F 21/54 380/277 |
| 2014/0270156 A1* | 9/2014 | Joye | .......................... | H04L 9/30 380/30 |
| 2015/0161361 A9* | 6/2015 | Stewart | .................... | G06F 21/79 375/240.25 |
| 2015/0271158 A1* | 9/2015 | Ronca | .................. | H04L 9/0819 713/168 |
| 2016/0072625 A1* | 3/2016 | Takashima | .............. | H04L 9/065 380/44 |
| 2016/0154744 A1* | 6/2016 | Zheng | .................. | H04L 9/0822 713/193 |
| 2016/0315765 A1* | 10/2016 | Zheng | ................. | G06F 12/1408 |
| 2018/0013548 A1* | 1/2018 | Yellepeddy | ............. | G06F 21/79 |

FOREIGN PATENT DOCUMENTS

| | | | |
|---|---|---|---|
| CN | 102932141 A | 2/2013 | |
| WO | WO-2012072703 A1 * | 6/2012 | .......... H04L 9/0825 |
| WO | WO-2012072707 A1 * | 6/2012 | .......... H04L 9/0825 |

OTHER PUBLICATIONS

Pascal Cotret et al., "Distributed Security for Communications and Memoriesin a Multiprocessor Architecture", Parallel and Distributed Processing Workshops and PHD Forum (IPDPSW), 2011 IEEE International Symposium on, IEEE, May 16, 2011 (May 16, 2011), pp. 326-329.

Lubos Gaspar et al: "Secure extension of FPGA general purpose processors for symmetric key cryptography with partial reconfiguration capabilities", ACM Transactions on Reconfigurable Technology and Systems, Jan. 1, 2012, pp. 27-755152.

Chinese First Office Action for Chinese Application Serial No. 201480079423.5 dated Oct. 19, 2018, 6 pages. (English Translation Not Available).

* cited by examiner

CRYPTOGRAPHIC CHIP AND RELATED METHODS

The present application is the United States national stage of International Application No. PCT/EP2014/056445, filed Mar. 31, 2014, the entire content of which is incorporated herein by reference.

FIELD OF THE INVENTION

The present invention relates to a cryptographic chip and related methods. In particular, the present invention relates to a chip for performing cryptographic operations, a chip-implemented method of performing a cryptographic operation, and a method of loading a new rule into a rule storage module of a chip.

BACKGROUND OF THE INVENTION

The broadcast delivery of digital content often uses scrambling of the broadcast stream to protect the content against unauthorised viewing. The key to scramble and descramble the broadcast stream is called a Control Word (CW). A Conditional Access (CA) or Digital Rights Management (DRM) system implements the selective distribution of the CWs to authorised receivers only. A common attack uses the fact that a CW is a shared key that unlocks content on all receivers. An adversary can break part of the key delivery infrastructure to obtain CWs and can redistribute these keys to unauthorised receivers. This CW sharing attack is prevented by securing the delivery of a CW to a descrambling and decoding chip set. Current chip sets support a key hierarchy to secure the CW delivery based on secret keys installed during the manufacturing process. A typical receiver diagram is illustrated schematically in FIG. 1. The exemplary chip set 100 of FIG. 1 uses symmetric cryptographic algorithms, but it is also possible to use public-key cryptography for securely delivering CWs to a descrambling and decoding chip set.

With reference to FIG. 1, the chip manufacturer personalizes the descrambling and decoding chip set 100 with a pseudo-random value for the Chip Set Unique Key (CSUK) and assigns a value to the Chip Set Serial Number (CSSN). The CSUK is the most valuable asset of a chip set since this is the key from which all other keys are derived. The manufacturer supplies a list of (CSSN, CSUK) pairs to a CA/DRM supplier, enabling the loading of a value of the Chip Set Load Key (CSLK) into a particular chip set. In particular, the CSLK is supplied to the chip set 100 in encrypted form, and may only be decrypted using the CSUK of the chip set 100. The CSLK is used to securely load a CW into the chip set 100, as depicted in FIG. 1. In particular, the CW is supplied to the chip set 100 in encrypted form, and may only be decrypted using the CSLK of the chip set 100. Subsequently, the CW may be used to decrypt encrypted content supplied to the chip set 100.

Variants of this CW loading mechanism are described in EP2362575, WO2012/072703, WO2012/072704, WO2013/060391, WO2012/072707 and WO2013/120538, all of which are incorporated herein by reference There also are vendor-specific proprietary mechanisms to load keys into a chip using a secured on-chip module. These modules typically are specified by Conditional Access vendors or Digital Rights Management vendors and they are implemented within a secured processor module of a System on a Chip (SoC). The secured processor module is a separate computing platform on the SoC implemented in a way that secures the functions and data in the module. FIG. 2 is a schematic diagram of some typical components in such a SoC 200.

FIG. 2 schematically illustrates the architecture of a SoC 200 including a secured processor module 210 and an application processor module 220. The secured processor module 210 includes secured memory modules, such as key registers, SRAM, ROM and one-time programmable (OTP) memory. The secured processor module 210 also includes cryptographic components such as Data Encryption Standard (DES) and Advanced Encryption Standard (AES) modules. The secured processor module 210 also includes a random number generator, a private CPU and custom hardware modules. There is also a serial link for communicating with a serial link of the application processor module 220. The application processor module 220 includes a main CPU, functional modules and memory modules (e.g. ROM and SRAM). The application processor module 220 also includes a content decryption module to directly receive CWs from the key registers of the secured processor module 210.

In order to implement the key ladder shown in FIG. 1, the private CPU in the secured processor module 210 is initialised with firmware to (a) receive an encrypted input message from the application processor module 220 via a serial link, (b) retrieve the keys indicated in the input message from the key registers, (c) set up the AES/DES module to process the encrypted parts of the input message, (d) retrieve the result, and (e) to send a content decryption key (i.e. a CW) to the content decryption module of the application processor module 220. The keys are stored and used entirely within the secured processor module 210. There is no component in the application processor module 220 that can directly access the internal data within the secured processor module 210. The resulting CW is transmitted using a dedicated data path to the content decryption module that cannot be read or modified by the main CPU of the application processor module 220.

The manufacturer can implement most proprietary security functions using dedicated firmware in the application processor module 220 and/or the secured processor module 210. However, for some very specific proprietary security functions, an implementation using custom hardware may be necessary; hence the custom hardware modules in the secured processor module 210. During the manufacturing process the custom hardware modules can be enabled selectively, as described in PCT/EP2012/004267 filed on 10 Oct. 2012, which is incorporated herein by reference.

SUMMARY OF THE INVENTION

The presence and selective enablement of multiple proprietary security functions such as key loading mechanisms motivates chip manufacturers to maximize the use of common components in each of these modules, e.g. descrambling block, secured key storage and secure (OTP) data initialisation. Thus, there is a need for a secured processor module which supports a wide range of key ladder implementations with only a minimal firmware and/or custom hardware footprint.

The main goal of a proprietary key loading module is to secure the implementation against reverse engineering attacks. One way to achieve this is by preventing the private CPU in the secured processor module from accessing data in the key registers of the secured processor module. However, the threat models for known secured processor modules do not consider attacks that modify the firmware of the secured processor modules. Such attacks may exploit errors in any of the components in the secured processor module (e.g. private CPU, SRAM, or ROM) or they may aim to modify the functionality of some of the secured processor module components. With such types of attacks, the keys in the secured processor module may become observable via the public interface. Thus, there is a need for a secured processor module which is less vulnerable to such attacks.

The present invention seeks to provide a cryptographic chip and associated methods which provide various advantages over those of the prior art.

The chip and associated methods of the present invention aim to shield sensitive symmetric block-cipher operations from the direct access by a General Purpose Processor (GPP) on the chip. The fact that GPPs are programmable adds special qualities and risks to their usage. The present invention aids in removing the risks by disallowing the GPP to access clear-keys, and by simplifying the interface for cryptographic operations by clustering them according to rules.

For example, the most common way for chipsets in today's consumer devices (such as set-top boxes, TVs and smart phones) to access scrambled contents is to unwrap the scrambling CW using on-chip cryptographic coprocessors. Security requirements and security designs vary a lot when it comes to how these operations and associated keys and outputs are handled; there are fairly strict requirements for set-top box chipsets as compared to much less stringent requirements for tablet chipsets and mobile chipsets. In general, very few chipsets allow for flexibility while ensuring that the critical (high security) keys are not compromised. Mostly, GPPs can access clear keys or unwrapped secrets, without possibility for a System Integrator or a Security Vendor to switch off this access.

In contrast, the present invention uses a mixture of software and hardware shielding keys and cryptographic operations. This mixture aims to close the aforementioned vulnerability gap by using rule-based access-control and separation-of-concerns when handling keys and cryptographic operations.

According to a first aspect of the present invention, there is provided a chip for performing cryptographic operations. The chip comprises a key storage module, a rule storage module, an interface module and a cryptographic module. The key storage module is configured to store one or more cryptographic keys. The rule storage module is configured is to store one or more rules, each rule comprising respective rule data, the rule data identifying a respective predetermined cryptographic operation associated with the rule and further identifying at least one of the one or more cryptographic keys to be used in the respective predetermined cryptographic operation. The interface module is configured to receive a rule execution request, wherein the rule execution request comprises a rule identifier to identify a specific rule of the one or more rules to be executed. The cryptographic module is configured to execute the specific rule so as to perform the respective predetermined cryptographic operation in response to the rule execution request. The chip is configured such that the cryptographic keys and the cryptographic module may only be used by executing rules from the one or more rules in response to associated rule execution requests received by the interface module.

According to a second aspect of the present invention, there is provided a set top box comprising the chip of the first aspect.

According to a third aspect of the present invention, there is provided a chip-implemented method of performing a cryptographic operation. The chip comprises a key storage module and a rule storage module. The key storage module is configured to store one or more cryptographic keys. The rule storage module is configured to store one or more rules, each rule comprising respective rule data, the rule data identifying a respective predetermined cryptographic operation associated with the rule and further identifying at least one of the one or more cryptographic keys to be used in the respective predetermined cryptographic operation. The method comprises: (i) receiving a rule execution request, wherein the rule execution request comprises a rule identifier to identify a specific rule of the one or more rules to be executed; and (ii) using a cryptographic module to execute the specific rule so as to perform the respective predetermined cryptographic operation in response to the rule execution request. The chip is configured such that the cryptographic keys and the cryptographic module may only be used by executing rules from the one or more rules in response to associated rule execution requests.

According to a fourth aspect of the present invention, there is provided a method of loading a new rule into a rule storage module of a chip. The chip further comprises a key storage module configured to store one or more cryptographic keys. The rule storage module is configured to store one or more rules, each rule comprising respective rule data, the rule data identifying a respective predetermined cryptographic operation associated with the rule and further identifying at least one of the one or more cryptographic keys to be used in the respective predetermined cryptographic operation. The method comprises: (a) receiving a rule loading request, wherein the rule loading request comprises a new rule identifier to identify the new rule to be loaded and further comprises new rule data defining the new rule, the new rule data identifying a specific cryptographic operation associated with the new rule and further identifying at least one of the one or more cryptographic keys to be used in the specific cryptographic operation; (b) assessing whether the rule loading request is allowable; and (c) in response to the rule loading request having been assessed as allowable, loading the new rule into a programmable portion of the rule storage module such that the new rule becomes one of the one or more rules.

Other preferred features of the present invention are set out in the appended claims.

BRIEF DESCRIPTION OF THE DRAWINGS

Embodiments of the present invention will now be described by way of example with reference to the accompanying drawings in which.

DETAILED DESCRIPTION OF A PREFERRED EMBODIMENT

In the description that follows and in the figures, certain embodiments of the invention are described. However, it will be appreciated that the invention is not limited to the embodiments that are described and that some embodiments may not include all of the features that are described below. It will be evident, however, that various modifications and changes may be made herein without departing from the broader spirit and scope of the invention as set forth in the appended claims.

Cryptographic Chip

Figure 1:
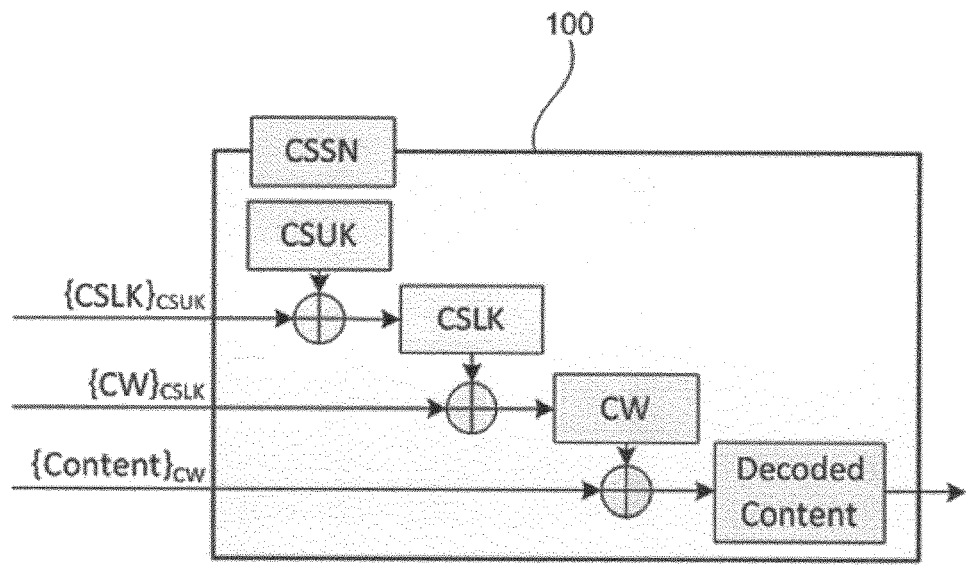
FIG. 1 schematically illustrates a descrambling and decoding chip set with a standard key ladder implementation.
Figure 2:
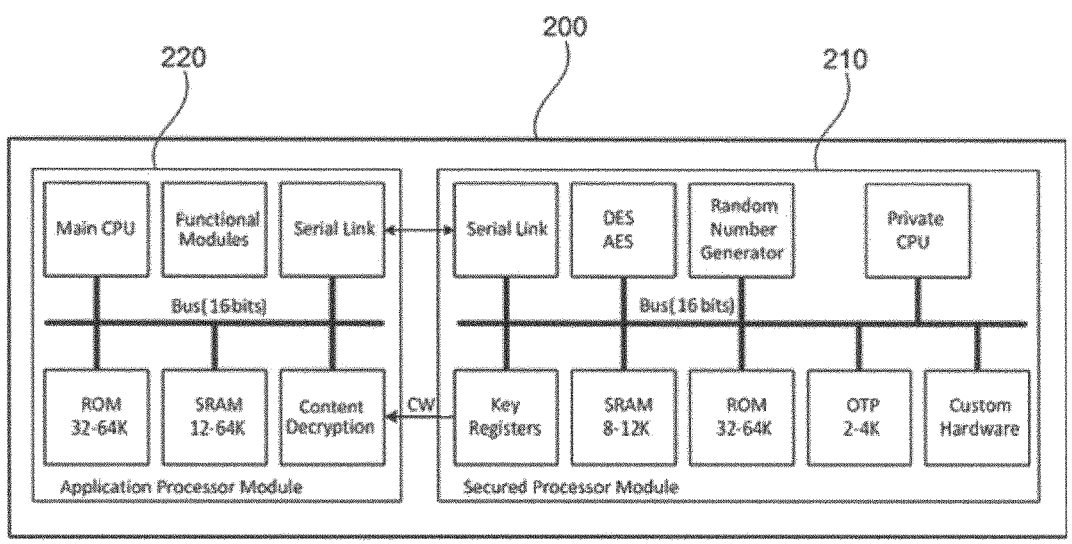
FIG. 2 schematically illustrates the architecture of a SoC including a secured processor module and an application processor module.
Figure 3:
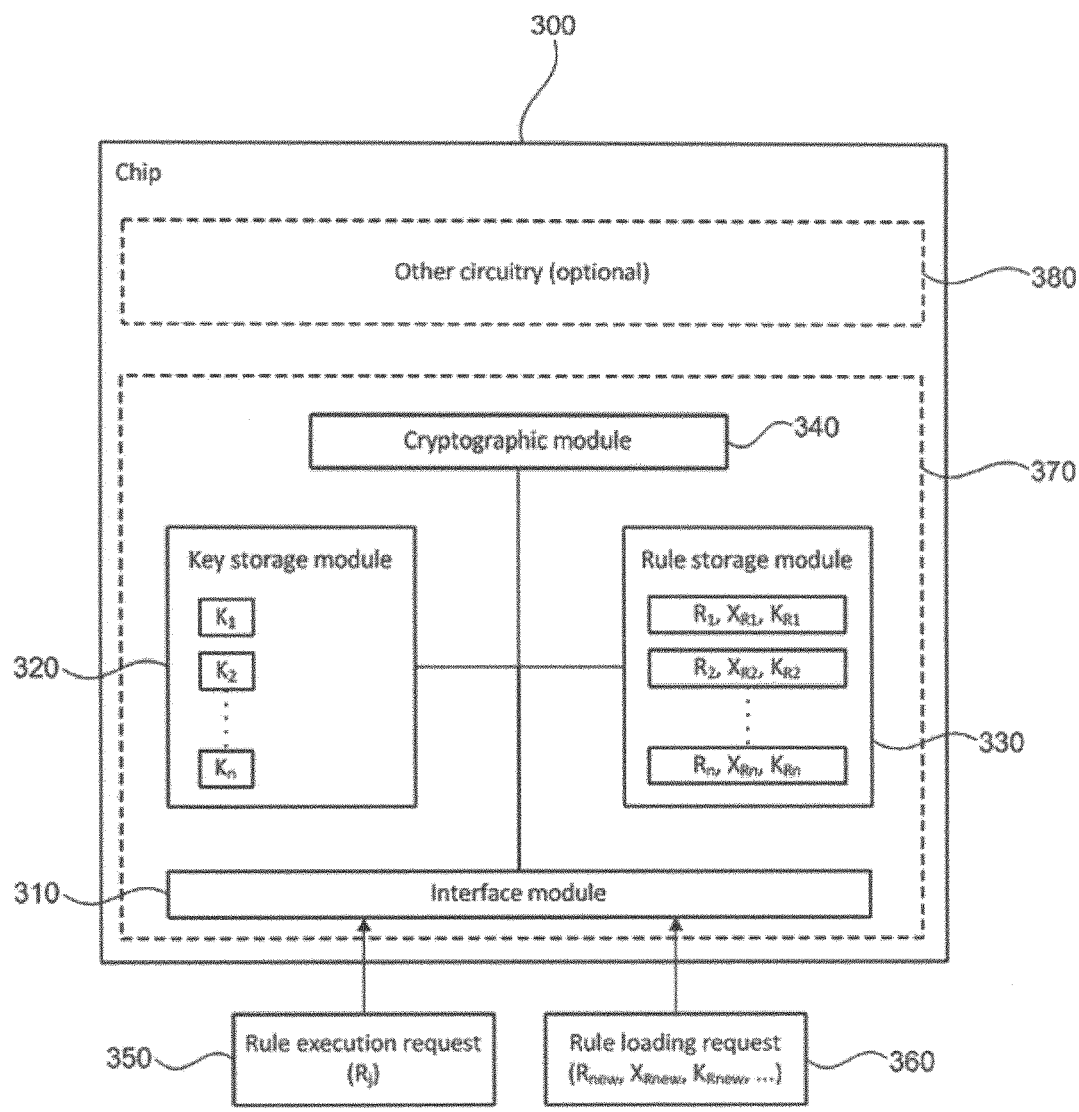
FIG. 3 schematically illustrates a chip for performing cryptographic operations in accordance with the present invention.

FIG. 3 shows a chip 300 for performing cryptographic operations in accordance with one embodiment of the invention. The chip comprises an interface module 310, a key storage module 320, a rule storage module 330 and a cryptographic module 340. The key storage module 320 is configured to store one or more cryptographic keys $K_1$, $K_2$, ... $K_n$. The rule storage module 330 is configured to store one or more rules $R_1$, $R_2$, ... $R_n$. The labels $R_1$, $R_2$, ... $R_n$ in FIG. 3 may be considered to be "rule identifiers" (or "rule tags") used to identify each rule. Each rule $R_i$ comprises respective rule data that identifies a respective predetermined cryptographic operation $X_{Ri}$ associated with the rule and further identifies at least one key $K_{Ri}$ of the one or more cryptographic keys to be used in the respective predetermined cryptographic operation $X_{Ri}$. The interface module 310 is configured to receive a rule execution request 350 which includes a rule identifier $R_j$ to identify a specific rule of the one or more rules to be executed. The cryptographic module 340 is configured to execute the specific rule $R_j$ so as to perform the respective predetermined cryptographic operation $X_{Rj}$ in response to the rule execution request 350. The chip is configured such that the cryptographic keys K and the cryptographic module 340 may only be used by executing rules from the one or more rules R in response to associated rule execution requests 350 received by the interface module 310.

The interface module 310 effectively controls operations involving the key storage module 320, the rule storage module 330 and the cryptographic module 340. Importantly, the interface module 310 provides indirect access to the key storage module 320, the rule storage module 330 and the cryptographic module 340 on the basis of rule execution requests 350 received by the interface module 310. In other words, the interface module 310 blocks direct external access (e.g. by a main CPU or GPP) to the key storage module 320, the rule storage module 330 and the cryptographic module 340. The cryptographic module 340 is not directly coupled to a general purpose bus (not shown) of the chip 300, but may only be accessed via the interface module 310. In one embodiment, neither keys K in the key storage module 320 nor rules R in the rule storage module 330 are directly accessible through physical memory-addresses. Instead, the rules are addressed by the rule identifiers $R_j$, and the keys are addressed by key identifiers (or "key tags") $K_j$. Notably, since the key identifiers are used to identify the various keys, each key identifier is unique. Similarly, each rule identifier is unique. Since a rule execution request 350 includes a rule identifier to identify the rule to be executed, and since each rule is associated with both a respective predetermined cryptographic operation and at least one respective key, this places limitations on how the cryptographic module may be used, i.e. the chip 300 enforces regular (i.e. normal, expected, allowed, rule-based) usage of the cryptographic module 340. The architecture of the chip 300 defines specific ways in which the cryptographic module 340 is allowed to be used. Each rule defines a prescribed or allowed operation of the cryptographic module 340 and cryptographic keys. In other words, there are "positive constraints" stating what is allowed: the cryptographic module 340 may only be used as specified in the rules R stored in the rule storage module 300. This is in contrast to alternative implementations which might define ways in which the chip 300 or cryptographic module 340 is not allowed to be used (i.e. the use of "negative constraints" stating what is not allowed). The use of positive constraints makes the chip 300 much harder to attack since negative constraints may have unforeseen loopholes, whereas positive constraints explicitly define exactly what is allowed.

The interface module 310, the key storage module 320, the rule storage module 330 and the cryptographic module 340 are all typically included in a secured module 370 of the chip 300, such as a secured processor module similar to secured processor module 210 of SoC 200. Other circuitry 380 may optionally be included on the chip 300, such that the chip 300 may be configured to perform other functionality in addition to the functionality provided by the secured module 370. In this embodiment, the secured module 370 may be controlled (i.e. interfaced) from this other functionality of the other circuitry 380. The other circuitry 380 may include an application processor module similar to the application processor module 320 of SoC 200. Thus, rule execution requests 350 may originate from the other circuitry 380, or may originate externally from the chip, as shown in FIG. 3. The key storage module 320 and the rule storage module 330 may be distinct from one another. Alternatively, at least part of the key storage module 320 and at least part of the rule storage module 330 may form part of the same memory.

Cryptographic Module

The cryptographic module 340 is operatively coupled to the interface module 310 so as to be able to respond as necessary to rule execution requests 350 received by the interface module 310. The cryptographic module 340 is also operatively coupled to the key storage module 320 and the rule storage module 330 so as enable the cryptographic module 340 to select the appropriate cryptographic operation(s) X and the appropriate cryptographic key(s) K for use. Such operative couplings may be direct or indirect. The cryptographic module 340 is capable of performing at least one cryptographic operation X. A cryptographic operation generally involves transforming input data into output data by means of the cryptographic operation and a key. The cryptographic operation may involve one or more of encryption, decryption, cryptographic hashing, digital signature generation, digital signature verification, Message Authentication Code (MAC) generation, MAC verification, etc., where such cryptographic operations are well known to those skilled in the art. For example, the cryptographic module 340 may encrypt or decrypt the input data using one or more of the stored cryptographic keys K, thereby providing encrypted or decrypted output data. In one embodiment, the cryptographic module 340 is capable of performing a number of different cryptographic operations X.

Alternatively, the cryptographic module 340 may only be capable of performing a single cryptographic operation X.

Key Storage Module

Figure 3A:
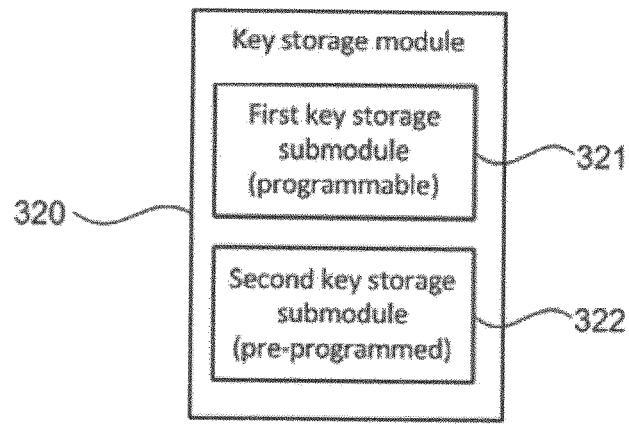
FIG. 3A schematically illustrates one embodiment of a key storage module of the chip of FIG. 3.

As mentioned above, the key storage module 320 is configured to store one or more cryptographic keys $K_1$, $K_2$, ... $K_n$. Thus, the key storage module 320 is a key memory module or key cache. The key storage module 320 preferably comprises first and second key storage submodules 321 and 322, as shown in FIG. 3A.

The first key storage submodule 321 is programmable, such that it may be used to store at least one further key of the one or more cryptographic keys. Thus, the first key storage submodule 321 is a writable memory component and may include, for example, one or more latches or one or more writable registers. The "writable" property of the first key storage submodule 321 means that the first key storage submodule 321 is a volatile memory component.

In contrast, the second key storage submodule 322 includes one or more pre-programmed keys of the one or more cryptographic keys. Thus, the second key storage submodule 322 may include a pre-programmed or hardwired memory component. Alternatively/additionally, the second key storage submodule 322 may include a memory component which loads keys automatically from OTP memory automatically after Power-On Reset (PoR) of the chip 300. The second key storage submodule 322 is used to store those keys requiring a high level of security relative to the keys stored in the first key storage submodule 321. For example, the second key storage submodule 322 would be used to store the CSUK of the chip 300.

The key storage module 320 may be implemented by means of one or more registers. A register provides a small amount of storage available as part of a CPU or other digital processor. Registers are normally at the top of the memory hierarchy, and provide the fastest way to access data. If the second key storage submodule 322 is implemented by means of one or more registers, then these registers may be seen as "constant value registers" since the high-security keys of the second key storage submodule 322 are hardwired or automatically filled with the OTP secrets after PoR. In contrast, as mentioned above, the first key storage submodule 321 may include one or more writable registers.

In one embodiment, the keys K may be stored in an encrypted format in the key storage module 320. In this case, encrypted keys may be decrypted using the cryptographic module 340 as and when they are required for particular cryptographic operations X. Alternatively, clear keys may be stored in the key storage module 320.

In one embodiment, the chip 300 is configured to load a new key $K_{new}$ into the first key storage submodule 321 by executing a key-derivation rule $R_{KD}$ of the one or more rules R. The key-derivation rule $R_{KD}$ is arranged to provide the new key $K_{new}$ as output data from the respective predetermined cryptographic operation $X_{RKD}$. Furthermore, the key-derivation rule $R_{KD}$ is arranged to store the output data (i.e. the new key $K_{new}$) in the first key storage submodule 321. The rule data for the key-derivation rule $R_{KD}$ should also provide a respective key identifier $K_{new}$ for the new key.

A preferred embodiment of the key storage module 320 will now be described. In this embodiment, the key storage module 320 has an array data structure, where each element of the array relates to a respective key. For example, each element of the array includes the respective key identifier and key value. Each element of the array may further include a respective security flag for the key (e.g. low security for programmable keys in the first key storage submodule 321, and high security for pre-programmed keys in the second key storage submodule 322). Advantageously, each security flag bit is hardwired to provide additional security. Each element of the array may further include a respective initialisation flag for the key (i.e. initialised or not initialised). Hardwired keys in the second key storage submodule 322 are always initialised. Other keys in the second key storage submodule 322 (e.g. keys which load automatically from OTP memory automatically after PoR) may be initialised at boot time of the chip 300 (i.e. after PoR of the chip 300). Keys in the first key storage submodule 321 may or may not be initialised. A key $K_{new}$ in the first key storage submodule 321 may be initialised following execution of the associated key-derivation rule $R_{KD}$. In other words, execution of a key-derivation rule $R_{KD}$ defines and saves a new key $K_{new}$ to the first key storage submodule 321, and this new key $K_{new}$ becomes initialised following execution of that key-derivation rule $R_{KD}$.

Rule Storage Module

Figure 3B:
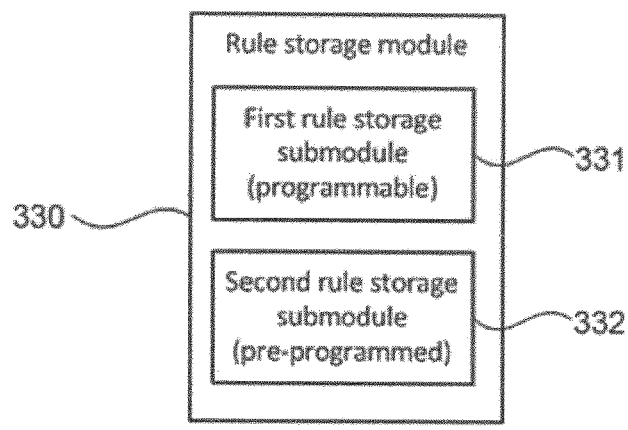
FIG. 3B schematically illustrates one embodiment of a rule storage module of the chip of FIG. 3.

As mentioned above, the rule storage module 330 is configured to store one or more rules $R_1$, $R_2$, ... $R_n$. Thus, the rule storage module 330 is a file or memory module for storing rules R, thereby defining allowed usage of the various keys K stored in the key storage module 320. The rule storage module 330 preferably comprises first and second rule storage submodules 331 and 332, as shown in FIG. 3B.

The first rule storage submodule 331 is programmable, such that it may be used to store at least one further rule of the one or more rules. Thus, the first rule storage submodule 331 is a writable memory component and may include, for example, one or more latches or one or more writable registers. The "writable" property of the first rule storage submodule 331 means that the first rule storage submodule 331 is a volatile memory component.

In contrast, the second rule storage submodule 332 includes one or more pre-programmed rules of the one or more rules. Thus, the second rule storage submodule 332 is a pre-programmed or hardwired memory component. Alternatively, the second rule storage submodule 332 may be a memory component which loads rule automatically from OTP memory automatically after Power-On Reset (PoR) of the chip 300. The second rule storage submodule 332 is used to store those rule requiring a high level of security relative to the rule stored in the first rule storage submodule 331. For example, the second rule storage submodule 332 would be used to store rules which use the CSUK.

The rule storage module 330 has an array data structure, where each element of the array is a respective rule. The number of rules R in the rule storage module 330 is limited by the size of the array. In general it is independent of the number of keys K, since multiple rules R can coexist for a single key K. As mentioned above, each rule $R_i$ comprises respective rule data which identifies a respective predetermined cryptographic operation $X_{Ri}$ associated with the rule and further identifies at least one of the one or more cryptographic keys $K_{Ri}$ to be used in the respective predetermined cryptographic operation. The rule data for each rule $R_i$ may include at least one of the following:

a) Data identifying a location of input data on which the respective predetermined cryptographic operation is to be performed. The location of input data may be identified directly (by physical memory-addresses) or indirectly. It is preferred that the input data location be identified on a per rule basis since this enables the input data location to be different for different rules. This enables different levels of security to be applied to the memory locations of input data for different rules. For example, a high security input data location would be desirable for a rule which performs a cryptographic operation using the high-security CSUK. However, in an alternative embodiment, it would be possible to have a predetermined location for the input data.

b) Data identifying a location for storing output data from the respective predetermined cryptographic operation. The location of output data may be identified directly (by physical memory-addresses) or indirectly. It is preferred that the output data location be identified on a per rule basis since this enables the output data location to be different for different rules. This enables different levels of security to be applied to the memory locations of output data for different rules. For example, a high security output data location may be desirable for a rule which performs a cryptographic operation using the high-security CSUK. Another advantage of identifying the output data location on a per-rule basis is that the output of some cryptographic operations may be another cryptographic key, and it may be desirable to store this key in the key storage module 320. In this case, the location for storing the output data is in first key storage submodule 321 of the key storage module 320. Therefore, identifying the output data location on a per-rule basis enables specification of the key storage module 320 as the output data location in such instances. However, in an alternative embodiment, it would be possible to have a predetermined location for the output data.

c) Data identifying a particular cryptographic algorithm to be used in the respective predetermined cryptographic operation. The particular cryptographic algorithm may be a symmetric-key algorithm in which the same key is used for encryption of plaintext and for decryption of ciphertext. Exemplary symmetric-key algorithms include Advanced Encryption Standard (AES), Data Encryption Standard (DES), Triple-DES, Blowfish, and Serpent. Alternatively, the particular cryptographic algorithm may be an asymmetric-key algorithm which requires two separate keys, one of which is secret (or private) and one of which is public; the public key is used to encrypt plaintext or to verify a digital signature, whereas the private key is used to decrypt ciphertext or to create a digital signature. Exemplary asymmetric-key algorithms include Rivest-Shamir-Adleman (RSA), El-Gamal, Elliptic curve cryptography (ECC). However, in an alternative embodiment, it is not necessary to identify a particular cryptographic algorithm if the same cryptographic algorithm is always used. For example, in a preferred embodiment, only the AES algorithm is used, so there is no need to identify a particular cryptographic algorithm to be used in the respective predetermined cryptographic operation.

d) Data identifying a mode of operation of the particular cryptographic algorithm to be used in the respective predetermined cryptographic operation. Such data is only required if the particular cryptographic algorithm has multiple modes of operation. For example, if the particular cryptographic algorithm is AES, then the rule data may include data identifying the AES chaining mode, and/or data relating to the number of AES blocks (e.g. data indicating whether or not there are multiple blocks of AES data), and/or data identifying a key length of the at least one of the one or more cryptographic keys to be used in the cryptographic operation.

e) Data indicating whether the respective predetermined cryptographic operation is to be used for encryption or decryption of the input data. This is a specific example of the rule data identifying a respective predetermined cryptographic operation. This specific example may be used, for example, in the AES-only embodiment mentioned in (c) above.

Advantageously, the rule data for each rule $R_i$ does not include information concerning key values or memory contents.

Advantageously, it should be implicit from the rule data for each rule as to whether that rule is initialised or not. Hardwired rules in the second rule storage submodule 332 are always initialised. Other rules in the second rule storage submodule 322 (e.g. rules which load automatically from OTP memory automatically after PoR) may be initialised at boot time of the chip 300 (i.e. after PoR of the chip 300). Rules in the first rule storage submodule 331 may or may not be initialised. Further detail regarding initialisation of rules is given below.

Interface Module

In an advantageous embodiment, the interface module 310 is further configured to assess whether the rule execution request 350 is allowable. In this embodiment, the cryptographic module 340 is configured to execute the specific rule $R_j$ so as to perform the respective predetermined cryptographic operation only in response to the rule execution request 350 having been assessed as allowable by the interface module 310. In addition, the chip 300 may be configured to execute a security incident procedure in response to the rule execution request 350 having been assessed as not allowable by the interface module 310.

As shown in FIG. 3, the interface module 310 may also be configured to receive a rule loading request 360. The rule loading request 360 comprises a new rule identifier $R_{new}$ to identify a new rule to be loaded. The rule loading request 360 further comprises new rule data defining the new rule. The new rule data identifies a specific cryptographic operation $X_{new}$ associated with the new rule and further identifies at least one key $K_{new}$ of the one or more cryptographic keys K to be used in the specific cryptographic operation $X_{new}$. In response to the rule loading request 360, the chip 300 is configured to load the new rule $R_{new}$ into the first rule storage submodule 331 such that the new rule $R_{new}$ becomes one of the one or more rules R. At this stage, the new rule $R_{new}$ is initialised in the first rule storage submodule 331. Thus, this embodiment provides a mechanism for loading new rules into the writable portion of the rule storage module 330.

In an advantageous embodiment, the interface module 310 is further configured to assess whether the rule loading request 360 is allowable. In this embodiment, the chip 300 is configured to load the new rule $R_{new}$ into the first rule storage submodule 331 only in response to the rule loading request 360 having been assessed as allowable by the interface module 310. In addition, the chip 300 may be configured to execute a security incident procedure in response to the rule loading request 360 having been assessed as not allowable by the interface module 310.

Chip-Implemented Method of Performing a Cryptographic Operation

Figure 4A:
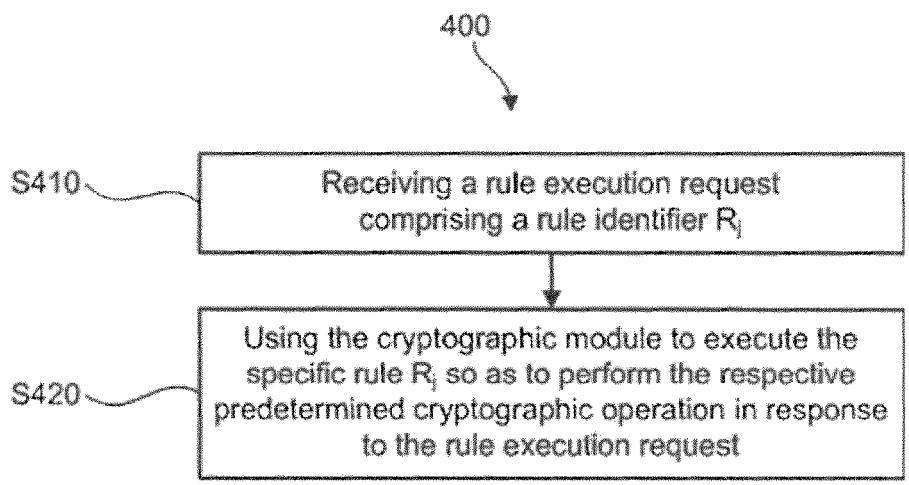
FIGS. 4A and 4B schematically illustrate a chip-implemented method of performing a cryptographic operation in accordance with one embodiment of the present invention.

A chip-implemented method of performing a cryptographic operation X will now be described with reference to the chip 300 of FIG. 3. As shown in FIG. 4A, the method 400 comprises, at step S410, receiving a rule execution request 350, wherein the rule execution request 350 comprises a rule identifier $R_j$ to identify a specific rule of the one or more rules to be executed. At step S420, the cryptographic module 340 is used to execute the specific rule $R_j$ so as to perform the respective predetermined cryptographic operation $X_{Rj}$ in response to the rule execution request 350. As discussed above, the chip 300 is configured such that the cryptographic keys K and the cryptographic module 340 may only be used by executing rules from the one or more rules R in response to associated rule execution requests 350.

Figure 4B:
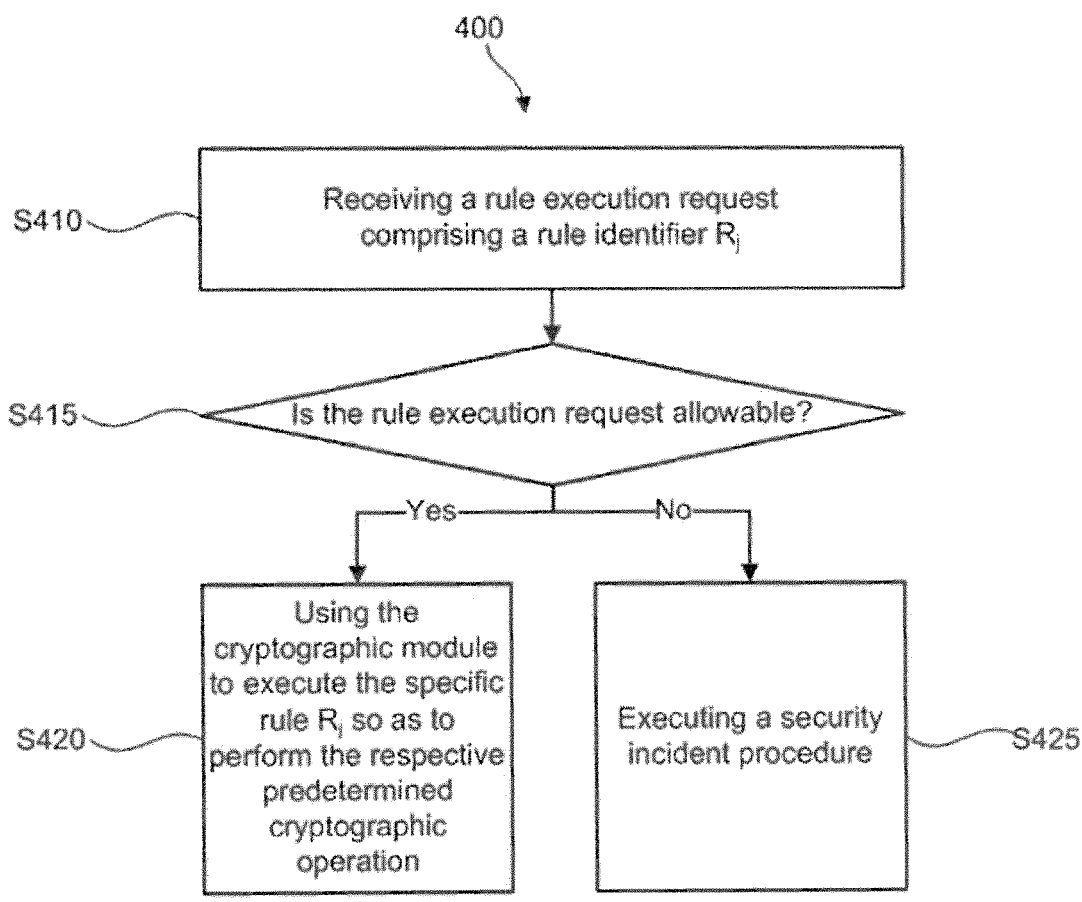

An advantageous implementation of the method 400 is shown in FIG. 4B. In this case, after receiving a rule execution request in step S410, there is an additional step S415 of assessing whether the rule execution request 350 is allowable. If the rule execution request 350 is assessed as allowable, the method 400 returns to step S420 and the cryptographic module is used to execute the specific rule $R_j$ so as to perform the respective predetermined cryptographic operation $X_{Rj}$. Alternatively, if the rule execution request 350 is assessed as not allowable, a security incident procedure is executed at step S425. Step S425 is optional but advantageous, in that it increases security.

Advantageously, the execution of a rule in step S420 is an atomic operation; that is to say that the execution of the rule will either succeed or fail. The rule execution may not be split up into separate operations such as: "key load", "load input", "execute", and "store output", because these would make the execution non-atomic. Similarly, the loading of a rule in step S530 is an atomic operation.

As part of assessing whether the rule execution request 350 is allowable in step S415, various checks may be carried out. For example, it may be checked whether the rule to be executed is initialised. Only initialised rules may be executed. Therefore, if the rule execution request 350 relates to a non-initialised rule, then the rule execution request 350 is deemed not allowable and the method 400 proceeds to execute the security incident procedure in step S425. Alternatively/additionally, the various data locations specified in the rule data may be checked to ensure that they are allowable. In particular, it is desirable to check the input data location, the output data location, and the cryptographic key location. For example, a key identifier which specifies a non-initialised key would not be allowable. In another example, use of a high security key in combination with a low security output data location would not be allowable. If the rule execution request 350 relates to disallowed data locations (either individually or when they are combined), then the rule execution request 350 is deemed not allowable and the method 400 proceeds to execute the security incident procedure in step S425. An example of allowed and disallowed data location combinations is given in Table 1 below where HS stands for "high security" and LS stands for "low security". Additional/alternative checks may be performed as desired.

Method of Loading a New Rule

Figure 5:
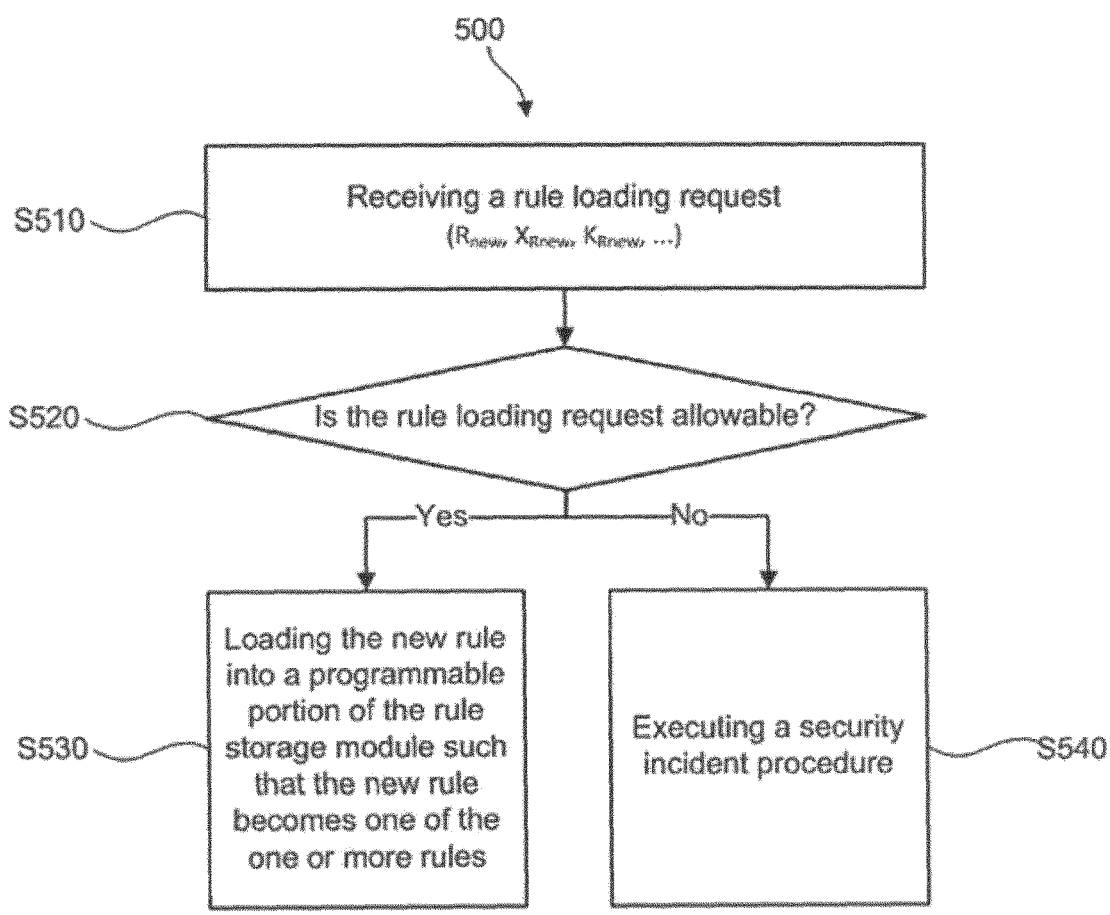
FIG. 5 schematically illustrates a method of loading a new rule into a rule storage module of a chip in accordance with one embodiment of the present invention.

A method of loading a new rule into a rule storage module of a chip will now be described with reference to the chip 300 of FIG. 3. As shown in FIG. 5, the method 500 comprises, at step S510, receiving a rule loading request 360. The rule loading request 360 comprises a new rule identifier $R_{new}$ to identify the new rule to be loaded, and further comprises new rule data defining the new rule. The new rule data identifies a specific cryptographic operation $X_{Rnew}$ associated with the new rule and further identifies at least one key $K_{Rnew}$ of the one or more cryptographic keys to be used in the specific cryptographic operation $X_{Rnew}$. At step S520, the method 500 assesses whether the rule loading request 360 is allowable. At step S530, in response to the rule loading request 360 having been assessed as allowable, the new rule $R_{new}$ is loaded into the first rule storage submodule 331 (i.e. the programmable portion) of the rule storage module 330 such that the new rule $R_{new}$ becomes one of the one or more rules R. Optionally, but advantageously, the method 500 further comprises, in response to the rule loading request having been assessed as not allowable, executing a security incident procedure at step S540.

As part of assessing whether the rule loading request 360 is allowable in step S520, various checks may be carried out. For example, it may be checked whether the new rule is to be loaded into the first rule storage module 331 (i.e. the programmable portion) or the second rule storage module 332 (i.e. the pre-programmed portion). New rules are only allowed to be loaded into the first rule storage module 331 for security reasons. Therefore, if the rule loading request 360 relates to a new rule to be loaded into the second rule storage module 332, then the rule loading request 360 is deemed not allowable and the method 500 proceeds to execute the security incident procedure in step S540. This may occur where the new rule identifier $R_{new}$ relates to a rule in the second rule storage module 332. It may alternatively/additionally be checked whether the new rule is to be loaded is already initialised. If the rule loading request 360 relates to a rule which is already initialised, then the rule loading request 360 is deemed not allowable and the method 500 proceeds to execute the security incident procedure in step S540. This may occur where the new rule identifier $R_{new}$ relates to a rule in the first rule storage module 331 that has already been initialised. It may alternatively/additionally be checked whether the new rule includes any fields (e.g. source, destination, key identifier) having a high level of security. New rules to be loaded into the first rule storage module 331 implicitly have a lower level of security than pre-programmed rules in the second rule storage module 332. Therefore, for example, if the new rule data specifies use of a high security key from the second key storage submodule 322 (e.g. the CSUK of the chip 300), then the

TABLE 1

|  | HS rule<br>LS key | HS rule<br>HS key | LS rule<br>HS key | LS key<br>LS key |
|---|---|---|---|---|
| LS input data location<br>LS output data location | Allowed | Allowed | Security incident<br>procedure | Allowed |
| LS input data location<br>HS output data location | Security incident<br>procedure | Allowed | Security incident<br>procedure | Security incident<br>procedure |
| HS input data location<br>HS output data location | Security incident<br>procedure | Security incident<br>procedure | Security incident<br>procedure | Security incident<br>procedure |
| HS input data location<br>LS output data location | Allowed | Allowed | Security incident<br>procedure | Security incident<br>procedure | rule loading request 360 is deemed not allowable and the method 500 proceeds to execute the security incident procedure in step S540.

Thus, it will be understood that the usage of the secured module 370 of the chip 300 is restricted to requests 350 to execute specific rules or requests 360 to load new rules. No other usage of the secured module 370 is allowed. In particular, access to the cryptographic module 340 is only by means of a rule execution request 350 submitted via the interface module 310. The chip 300 therefore enforces regular, predetermined, rule-based, normal, expected usage of the cryptographic module 340. If the chip 300 detects an irregular, unknown, abnormal, unexpected usage request, a security incident procedure is executed.

Security Incident Procedure

A preferred embodiment of a security incident procedure will now be described. This preferred procedure would be appropriate to execute as part of step S425 and/or as part of step S540 as mentioned above.

In the preferred embodiment, the security incident procedure is stored in non-volatile memory (e.g. ROM). The security incident procedure may be configured to clear the first key storage submodule 321 and the first rule storage submodule 331 (i.e. the writable portions of the key storage module 320 and the rule storage module 330) by means of hardware lines designated for this purpose. For example, the security incident procedure may be able to purge the contents of first key storage submodule 321 and the first rule storage submodule by means of setting a bit in a special purpose register, where setting of this bit is hardwired to clear the volatile memories. This implementation is advantageous in that it uses a hardware implementation in preference to a software loop. Alternatively/additionally, the security incident procedure may be configured to require a cold reset of the chip 300 to enable the secured module 370 of the chip 300 to become operational once again.

AES Embodiment

Aspects of a preferred embodiment of the chip 300 will now be described in which the cryptographic module 340 is an AES module.

Figure 3C:
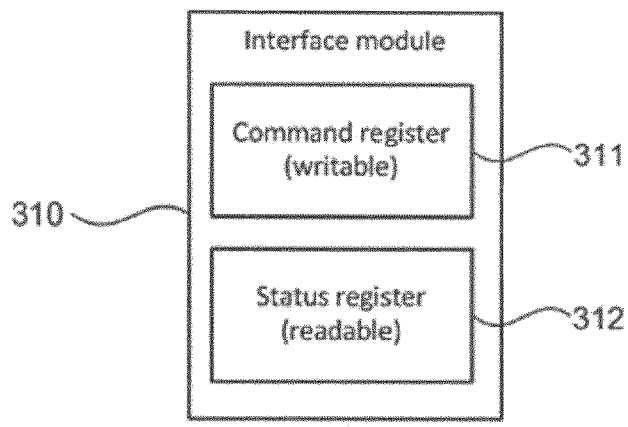
FIG. 3C schematically illustrates one embodiment of an interface module of the chip of FIG. 3.

In this embodiment, the interface module 310 comprises a command register 311 and a status register 312, as shown in FIG. 3C. The command register 311 is a writable from outside the secured module 370 of the chip 300, whereas the status register 312 is only readable from outside the secured module 370 of the chip 300.

The command register 311 is used for two purposes, namely for loading a new rule into the first rule storage submodule 331, and for executing any existing rule from the rule storage module 330. The command register 311 consists of three fields: rule identifier, rule action and rule payload. The rule identifier, or rule tag, (e.g. $R_{34}$) identifies the rule. The rule action enumerates the action; this is either loading or executing the relevant rule. The rule payload is linked to the rule action. If the rule action is "loading a new rule", then the rule payload bit encodes the new rule. If the rule action is "executing a rule", then the rule payload bit encodes the number of AES blocks of the associated input data.

In this embodiment, the status register 312 has two main fields: a status field and a report field. The status field may enumerate one of four possible states after a rule has been submitted. The report field may provide details regarding the enumerated state in more detail. The first possible state for the status field is "idle", indicating that the command register 311 can be immediately used. Following previous use of the command register 311, the "idle" state further indicates that the previous issued command has been successfully completed. The second possible state for the status field is "busy", indicating that one must wait for "idle" before using the command register 311. The third possible state for the status field is "unused", indicating a hardware implementation problem, and further indicating instigation of a "panic" mode, (e.g. following use of a security incident procedure). The fourth possible state for the status field is "error", indicating that the previous issued command generated an error, and resulted in use of a security incident procedure. Again, a "panic" mode may be instigated in this case.

In this embodiment, normal, regular usage of the command and status registers 311 and 312 can be described by the following pseudo-sequence:

1. Read the status register 312 and evaluate the status field:
   a. In case of "idle", move to the next operation in the sequence (positive case);
   b. In case of "busy", repeat this operation until "idle" detected (neutral case);
   c. In case of "error", go to the "panic" mode (negative case); d. In case of "unused", go to the "panic" mode (negative case).
2. Write the command register 311 to execute or load the identified rule.
3. Read the KCMI Status Register back and evaluate the status field:
   a. In case of "idle", proceed further (positive case);
   b. In case of "busy", repeat this operation until "idle" detected (neutral case);
   c. In case of "error", go to the "panic" mode (negative case);
   d. In case of "unused", go to the "panic" mode (negative case).

The first operation in the pseudo-sequence is necessary in order to handle re-entrant code. The second operation in the pseudo-sequence is the standard operation. The third operation in the pseudo-sequence serves as the conditional synchronization over the second operation completion.

In this AES-related embodiment, a preferred structure of the array of the rule storage module 330 includes the following fields: source, key identifier, destination, chaining mode, encrypt/decrypt, key length, and multi-block. The source field may specify a particular special purpose register from a selection of allowable special purpose registers. One or more of the allowable special purpose registers may be accessible from outside the secured module 370 of the chip 300. One or more of the allowable special purpose registers may not be accessible from outside the secured module 370 of the chip 300. The key identifier field is self-explanatory and specifies the key identifier(s) of the cryptographic key(s) to be used in the respective predetermined cryptographic operation. Alternatively, the key identifier field may specify a special purpose register accessible from outside the secured module 370 of the chip 300 so that a user-specified key may be used in the respective predetermined cryptographic operation. The destination field may specify a particular key identifier (if the rule is a key-derivation rule), or a particular special purpose register, or a descrambler. The chaining mode field specifies a particular AES chaining mode (e.g. ECB, CBC, PBCB, etc.). The encrypt/decrypt field specifies whether the AES module is to be used for encryption or decryption. The key length field specifies the AES key length (i.e. 128 bits, or 192 bits, or 256 bits). The multi-block field specifies whether the rule applies to multiple AES blocks or not. Other fields may also be included as required. Whether or not a rule has been initialised is implicit from the data stored in each element of the array.

It will be appreciated that the methods described have been shown as individual steps carried out in a specific order. However, the skilled person will appreciate that these steps may be combined or carried out in a different order whilst still achieving the desired result.

It will be appreciated that embodiments of the invention may be implemented using a variety of different information processing systems. In particular, although the figures and the discussion thereof provide an exemplary computing system and methods, these are presented merely to provide a useful reference in discussing various aspects of the invention. Embodiments of the invention may be carried out on any suitable data processing device, such as a personal computer, laptop, personal digital assistant, mobile telephone, set top box, television, server computer, etc. Of course, the description of the systems and methods has been simplified for purposes of discussion, and they are just one of many different types of system and method that may be used for embodiments of the invention. It will be appreciated that the boundaries between logic blocks are merely illustrative and that alternative embodiments may merge logic blocks or elements, or may impose an alternate decomposition of functionality upon various logic blocks or elements.

It will be appreciated that the above-mentioned functionality may be implemented as one or more corresponding modules as hardware and/or software. For example, the above-mentioned functionality may be implemented as one or more software components for execution by a processor of the system. Alternatively, the above-mentioned functionality may be implemented as hardware, such as on one or more field-programmable-gate-arrays (FPGAs), and/or one or more application-specific-integrated-circuits (ASICs), and/or one or more digital-signal-processors (DSPs), and/or other hardware arrangements. Method steps implemented in flowcharts contained herein, or as described above, may each be implemented by corresponding respective modules; multiple method steps implemented in flowcharts contained herein, or as described above, may be implemented together by a single module.

It will be appreciated that, insofar as embodiments of the invention are implemented by a computer program, then a storage medium and a transmission medium carrying the computer program form aspects of the invention. The computer program may have one or more program instructions, or program code, which, when executed by a computer carries out an embodiment of the invention. The term "program" as used herein, may be a sequence of instructions designed for execution on a computer system, and may include a subroutine, a function, a procedure, a module, an object method, an object implementation, an executable application, an applet, a servlet, source code, object code, a shared library, a dynamic linked library, and/or other sequences of instructions designed for execution on a computer system. The storage medium may be a magnetic disc (such as a hard drive or a floppy disc), an optical disc (such as a CD-ROM, a DVD-ROM or a BluRay disc), or a memory (such as a ROM, a RAM, EEPROM, EPROM, Flash memory or a portable/removable memory device), etc. The transmission medium may be a communications signal, a data broadcast, a communications link between two or more computers, etc.

The invention claimed is:

1. A chip for performing cryptographic operations, the chip comprising:
   a key storage module configured to store one or more cryptographic keys;
   a rule storage module configured to store one or more rules, each rule comprising respective rule data, the rule data identifying a respective predetermined cryptographic operation associated with the rule and further identifying at least one of the one or more cryptographic keys to be used in the respective predetermined cryptographic operation;
   an interface module configured to receive a rule execution request, wherein the rule execution request comprises a rule identifier to identify a specific rule of the one or more rules to be executed; and
   a cryptographic module configured to execute the specific rule so as to perform the respective predetermined cryptographic operation in response to the rule execution request;
   wherein the chip is configured such that the cryptographic keys and the cryptographic module may only be used by executing rules from the one or more rules in response to associated rule execution requests received by the interface module;
   wherein the interface module is configured to receive the rule execution request from other circuitry included on the chip or from externally of the chip and wherein the interface module is further configured to assess whether the rule execution request is allowable;
   wherein the cryptographic module is configured to execute the specific rule so as to perform the respective predetermined cryptographic operation in response to the rule execution request having been assessed as allowable by the interface module and not execute the specific rule in response to the rule execution request having been assessed as not allowable by the interface module.

2. The chip of claim 1 wherein the chip is configured to execute a security incident procedure in response to the rule execution request having been assessed as not allowable by the interface module.

3. The chip of claim 1 wherein the key storage module comprises a first key storage submodule, the first key storage submodule being programmable to store at least one further key of the one or more cryptographic keys.

4. The chip of claim 1 wherein the key storage module comprises a second key storage submodule including one or more pre-programmed keys of the one or more cryptographic keys.

5. The chip of claim 1 wherein the rule storage module comprises a first rule storage submodule, the first rule storage submodule being programmable to store at least one further rule of the one or more rules.

6. The chip of claim 5 wherein the chip is configured to load a new key into the first key storage submodule by executing a key-derivation rule of the one or more rules, wherein the key-derivation rule is arranged to provide said new key as output data from the respective predetermined cryptographic operation, and wherein the key-derivation rule is arranged to store said output data in the first key storage module.

7. The chip of claim 5:
   wherein the interface module is further configured to receive a rule loading request, the rule loading request comprising a new rule identifier to identify a new rule to be loaded and further comprising new rule data defining the new rule, the new rule data identifying a specific cryptographic operation associated with the new rule and further identifying at least one of the one or more cryptographic keys to be used in the specific cryptographic operation; and wherein, in response to the rule loading request, the chip is configured to load the new rule into the first rule storage submodule such that the new rule becomes one of the one or more rules.

8. The chip of claim 7 wherein the interface module is further configured to assess whether the rule loading request is allowable, and wherein the chip is configured to load the new rule into the first rule storage submodule in response to the rule loading request having been assessed as allowable by the interface module.

9. The chip of claim 8 wherein the chip is configured to execute a security incident procedure in response to the rule loading request having been assessed as not allowable by the interface module.

10. The chip of claim 1 wherein the rule storage module comprises a second rule storage submodule including one or more pre-programmed rules of the one or more rules.

11. The chip of claim 1 wherein one or both of the key storage module and the rule storage module are implemented by means of one or more registers.

12. The chip of claim 1 wherein the rule data for each rule comprises at least one of the following:
   a) data identifying a location of input data on which the respective predetermined cryptographic operation is to be performed;
   b) data identifying a location for storing output data from the respective predetermined cryptographic operation;
   c) data identifying a particular cryptographic algorithm to be used in the respective predetermined cryptographic operation;
   d) data identifying a mode of operation of the particular cryptographic algorithm to be used in the respective predetermined cryptographic operation; and
   e) data indicating whether the respective predetermined cryptographic operation is to be used for encryption or decryption of the input data.

13. A set top box comprising a chip for performing cryptographic operations, the chip comprising:
   a key storage module configured to store one or more cryptographic keys;
   a rule storage module configured to store one or more rules, each rule comprising respective rule data, the rule data identifying a respective predetermined cryptographic operation associated with the rule and further identifying at least one of the one or more cryptographic keys to be used in the respective predetermined cryptographic operation;
   an interface module configured to receive a rule execution request, wherein the rule execution request comprises a rule identifier to identify a specific rule of the one or more rules to be executed; and
   a cryptographic module configured to execute the specific rule so as to perform the respective predetermined cryptographic operation in response to the rule execution request;
   wherein the chip is configured such that the cryptographic keys and the cryptographic module may only be used by executing rules from the one or more rules in response to associated rule execution requests received by the interface module;
   wherein the interface module is configured to receive a rule execution request from other circuitry included on the chip or from externally of the chip and wherein the interface module is further configured to assess whether the rule execution request is allowable;
   wherein the cryptographic module is configured to execute the specific rule so as to perform the respective predetermined cryptographic operation in response to the rule execution request having been assessed as allowable by the interface module and not execute the specific rule in response to the rule execution request having been assessed as not allowable by the interface module.

14. A chip-implemented method of performing a cryptographic operation, the chip comprising a key storage module configured to store one or more cryptographic keys, the chip further comprising a rule storage module configured to store one or more rules, each rule comprising respective rule data, the rule data identifying a respective predetermined cryptographic operation associated with the rule and further identifying at least one of the one or more cryptographic keys to be used in the respective predetermined cryptographic operation, the method comprising:
   (i) receiving a rule execution request, wherein the rule execution request comprises a rule identifier to identify a specific rule of the one or more rules to be executed; and
   (ii) using a cryptographic module to execute the specific rule so as to perform the respective predetermined cryptographic operation in response to the rule execution request;
   wherein the chip is configured such that the cryptographic keys and the cryptographic module may only be used by executing rules from the one or more rules in response to associated rule execution requests; and
   wherein the rule execution request is received from other circuitry included on the chip or from externally of the chip; and
   wherein step (ii) comprises assessing whether the rule execution request is allowable and, in response to the rule execution request having been assessed as allowable, using the cryptographic module to execute the specific rule so as to perform the respective predetermined cryptographic operation and in response to the rule execution request having been assessed as not allowable, not executing the specific rule.

15. The chip-implemented method of claim 14 further comprising:
   (iii) in response to the rule execution request having been assessed as not allowable, executing a security incident procedure.

16. A method, implemented by one or more processors, of loading a new rule into a rule storage module of a chip, the chip further comprising a key storage module storing one or more cryptographic keys, the rule storage module storing one or more rules, each rule comprising respective rule data, the rule data identifying a respective predetermined cryptographic operation associated with the rule and further identifying at least one of the one or more cryptographic keys to be used in the respective predetermined cryptographic operation, the method comprising:
   (a) receiving a rule loading request, wherein the rule loading request comprises a new rule identifier to identify the new rule to be loaded and further comprises new rule data defining the new rule, the new rule data identifying a specific cryptographic operation associated with the new rule and further identifying at least one of the one or more cryptographic keys to be used in the specific cryptographic operation;
   (b) assessing whether the rule loading request is allowable; and
   (c) in response to the rule loading request having been assessed as allowable, loading the new rule into a programmable portion of the rule storage module such that the new rule becomes one of the one or more rules and in response to the rule loading request having been assessed as not allowable, not loading the new rule into the programmable portion.

17. The method of claim 16 further comprising:
(d) in response to the rule loading request having been assessed as not allowable, executing a security incident procedure.

\* \* \* \* \*